United States Patent
Gabbianelli et al.

(10) Patent No.: US 6,689,982 B2
(45) Date of Patent: Feb. 10, 2004

(54) APPARATUS AND METHOD FOR WELDING ALUMINUM TUBES

(75) Inventors: Gianfranco Gabbianelli, Troy, MI (US); Richard D. Ashley, Berkley, MI (US); Victor J. Malczewski, Warren, MI (US)

(73) Assignee: Magna International, Inc., Aurora (CA)

( * ) Notice: Subject to any disclaimer, the term of this patent is extended or adjusted under 35 U.S.C. 154(b) by 0 days.

(21) Appl. No.: 10/042,384

(22) Filed: Jan. 11, 2002

(65) Prior Publication Data

US 2002/0104830 A1 Aug. 8, 2002

Related U.S. Application Data

(63) Continuation-in-part of application No. 09/518,646, filed on Mar. 3, 2000, now Pat. No. 6,346,684, which is a continuation-in-part of application No. 09/173,554, filed on Oct. 16, 1998, now Pat. No. 6,042,865.

(60) Provisional application No. 60/062,204, filed on Oct. 16, 1997.

(51) Int. Cl.[7] .......................... B23K 11/16; B23K 11/00; B23K 9/00; B23K 35/14

(52) U.S. Cl. .................... 219/118; 219/117.1; 219/148; 219/615; 228/56.3

(58) Field of Search ................. 219/117.1, 53, 219/59.1, 61, 61.2, 137, 78.01, 148, 615, 118; 228/183

(56) References Cited

U.S. PATENT DOCUMENTS

| | | |
|---|---|---|
| 1,581,931 A | 4/1926 | Lamplugh |
| 1,846,567 A | 2/1932 | Murray, Jr. |
| 2,269,451 A | 1/1942 | Ford ............................ 296/28 |
| 2,389,907 A | 11/1945 | Helmuth ....................... 296/28 |
| 2,467,636 A | 4/1949 | Stoudt et al. .................. 219/4 |
| 2,668,722 A | 2/1954 | Muller ........................ 280/106 |
| 2,787,699 A | * 4/1957 | Jessen .......................... 219/230 |
| 3,122,629 A | 2/1964 | Manz ............................ 219/74 |
| 3,159,419 A | 12/1964 | Kerby ............................ 296/28 |
| 3,630,056 A | 12/1971 | Cuq .............................. 72/28 |
| 3,644,695 A | 2/1972 | Shuey et al. ................ 219/59.1 |
| 3,718,798 A | 2/1973 | Randolph et al. ....... 219/125.12 |

(List continued on next page.)

FOREIGN PATENT DOCUMENTS

| | | |
|---|---|---|
| DE | 867059 | 1/1953 |
| DE | 4122862 | 1/1993 |
| DE | 19530835 A1 | 2/1997 |
| EP | 0457400 A1 | 11/1991 |
| EP | 0570150 A1 | 11/1993 |

(List continued on next page.)

OTHER PUBLICATIONS

"Lighter Car Body in Aluminum wqith Hydroforming Technology R&D Results," Hanicke et al., IBEC 96, Detroit, Oct. 1–3, 1996, Volvo Car Corporation.

International Application No. PCTR/CA 98/00962, PCT Search Report, mailed Jan. 17, 1999, Magna International Inc.

(List continued on next page.)

*Primary Examiner*—Renee L. Edmondson
(74) *Attorney, Agent, or Firm*—Pillsbury Winthrop LLP

(57) ABSTRACT

An apparatus and method for welding members that are formed at least in part of aluminum. A welding assembly is constructed and arranged to position a welding material in electrically conductive relation between exterior surface portions of first and second weldable members at a location where the first and second weldable members are to be joined. The welding material assembly includes at least one welding material member mounted on a flexible carrier sheet in a predetermined arrangement with each welding material member being constructed of an electrically conductive metallic welding material capable of melting when heated by application of an electrical current. A welding method includes alternatively attaching the welding material members to a weldable member without a carrier sheet, by a welding process.

13 Claims, 8 Drawing Sheets

U.S. PATENT DOCUMENTS

| | | | | |
|---|---|---|---|---|
| 3,876,852 | A | 4/1975 | Topham | 219/137 R |
| 3,900,151 | A * | 8/1975 | Schoer et al. | 228/220 |
| 3,971,588 | A | 7/1976 | Bauer | 296/28 |
| 4,023,557 | A * | 5/1977 | Thorne et al. | 126/677 |
| 4,051,704 | A | 10/1977 | Kimura | 72/58 |
| 4,141,482 | A | 2/1979 | Reynolds | |
| 4,142,085 | A | 2/1979 | Knipstrom et al. | 219/61 |
| 4,150,274 | A * | 4/1979 | Minin et al. | 219/137 R |
| 4,192,374 | A | 3/1980 | Hayden et al. | |
| 4,355,844 | A | 10/1982 | Muzzarelli | 296/205 |
| 4,408,112 | A | 10/1983 | Kazlauskas | |
| 4,441,006 | A | 4/1984 | Machida et al. | 219/85 |
| 4,471,519 | A | 9/1984 | Capello et al. | 29/460 |
| 4,592,577 | A | 6/1986 | Ayres et al. | |
| 4,611,830 | A | 9/1986 | Von Ahrens | |
| 4,618,163 | A | 10/1986 | Hasler et al. | 280/785 |
| 4,648,208 | A | 3/1987 | Baldamus et al. | 49/502 |
| 4,656,328 | A | 4/1987 | Weldon et al. | 219/59.1 |
| 4,660,345 | A | 4/1987 | Browning | 4052/648 |
| 4,726,166 | A | 2/1988 | DeRees | 52/694 |
| 4,728,760 | A | 3/1988 | Brolin et al. | 219/617 |
| 4,735,355 | A | 4/1988 | Browning | 228/189 |
| 4,759,111 | A | 7/1988 | Cudini | 29/523 |
| 4,835,356 | A | 5/1989 | Abe | 219/119 |
| 4,886,203 | A | 12/1989 | Puzrin et al. | |
| 4,906,313 | A | 3/1990 | Hill | 219/137 R |
| 4,906,823 | A | 3/1990 | Kushima et al. | |
| 4,933,531 | A | 6/1990 | Ichikawa et al. | 219/86.25 |
| 4,986,597 | A | 1/1991 | Clausen | 296/205 |
| 5,031,958 | A | 7/1991 | Fujita et al. | 296/194 |
| 5,094,313 | A | 3/1992 | Mauws | 180/210 |
| 5,106,249 | A | 4/1992 | Janotik | 411/43 |
| 5,107,095 | A | 4/1992 | Derbyshire | |
| 5,170,557 | A | 12/1992 | Rigsby | 138/148 |
| 5,209,541 | A | 5/1993 | Janotik et al. | 296/29 |
| 5,213,386 | A | 5/1993 | Janotik et al. | 296/29 |
| 5,228,259 | A | 7/1993 | Haddad et al. | 52/653.2 |
| 5,233,789 | A | 8/1993 | Priest et al. | 49/360 |
| 5,233,856 | A | 8/1993 | Shimanovski et al. | 72/62 |
| 5,269,585 | A | 12/1993 | Klages et al. | 296/205 |
| 5,271,687 | A | 12/1993 | Holka et al. | 403/233 |
| 5,320,403 | A | 6/1994 | Kazyak | 296/203 |
| 5,320,697 | A | 6/1994 | Hegler et al. | 219/110 |
| 5,332,281 | A | 7/1994 | Janotik et al. | 296/209 |
| 5,333,775 | A | 8/1994 | Bruggemann et al. | 228/157 |
| 5,338,080 | A | 8/1994 | Janotik et al. | 296/29 |
| 5,343,666 | A | 9/1994 | Haddad et al. | 52/648.1 |
| 5,380,978 | A | 1/1995 | Pryor | 219/125.12 |
| 5,389,760 | A | 2/1995 | Zollinger | 219/53 |
| 5,407,514 | A | 4/1995 | Butts et al. | |
| 5,407,520 | A | 4/1995 | Butts et al. | 228/155 |
| 5,411,777 | A | 5/1995 | Steele et al. | 428/34.9 |
| 5,445,001 | A * | 8/1995 | Snavely | 219/59.1 |
| 5,458,393 | A | 10/1995 | Benedyk | 296/203 |
| 5,460,026 | A | 10/1995 | Schafer | 72/55 |
| 5,476,725 | A * | 12/1995 | Papich et al. | 219/53 |
| 5,481,892 | A | 1/1996 | Roper et al. | 72/61 |
| 5,518,209 | A | 5/1996 | Chicoine et al. | 244/158 R |
| 5,549,352 | A | 8/1996 | Janotik et al. | 296/209 |
| 5,561,902 | A | 10/1996 | Jacobs et al. | 29/897.2 |
| 5,564,785 | A | 10/1996 | Schultz et al. | 297/452.2 |
| 5,577,796 | A | 11/1996 | Clausen | 296/202 |
| 5,581,947 | A | 12/1996 | Kowall et al. | 49/451 |
| 5,582,052 | A | 12/1996 | Rigsby | 72/62 |
| 5,600,983 | A | 2/1997 | Rigsby | 72/61 |
| 5,617,992 | A * | 4/1997 | Huddleston et al. | 228/183 |
| 5,641,176 | A | 6/1997 | Alatalo | 280/690 |
| 5,649,735 | A | 7/1997 | Tomforde et al. | 296/71 |
| 5,673,929 | A | 10/1997 | Alatalo | 280/690 |
| 5,718,048 | A | 2/1998 | Horton et al. | 29/897.2 |
| 5,720,092 | A | 2/1998 | Ni et al. | 29/421.1 |
| 5,720,511 | A | 2/1998 | Benedyk | 296/203 |
| 5,729,463 | A | 3/1998 | Koenig et al. | 219/119 |
| 5,765,906 | A | 6/1998 | Iwatsuki et al. | 296/203 |
| 5,783,794 | A * | 7/1998 | Oikawa et al. | 138/148 |
| 5,794,398 | A | 8/1998 | Kaehler et al. | 52/653.2 |
| 5,800,003 | A | 9/1998 | Clenet | 296/29 |
| 5,818,008 | A | 10/1998 | Cecil | 219/110 |
| 5,820,014 | A * | 10/1998 | Dozier, II et al. | 228/56.3 |
| 5,829,124 | A | 11/1998 | Kresge et al. | |
| 5,831,235 | A | 11/1998 | Cecil | 219/110 |
| 5,845,382 | A | 12/1998 | Schultz et al. | 29/421.1 |
| 5,848,853 | A | 12/1998 | Clenet | 403/272 |
| 5,953,945 | A | 9/1999 | Horton | 72/58 |
| 5,992,897 | A | 11/1999 | Hill et al. | |
| 6,000,603 | A * | 12/1999 | Koskenmaki et al. | 228/246 |
| 6,010,155 | A | 1/2000 | Rinehart | |
| 6,037,556 | A | 3/2000 | Rudd | 219/61.2 |
| 6,063,510 | A * | 5/2000 | Inabayashi et al. | 285/55 |
| 6,068,176 | A | 5/2000 | Petrikas | 228/56.3 |
| 6,092,865 | A * | 7/2000 | Jaekel et al. | 296/205 |
| 6,131,954 | A | 10/2000 | Campbell | 296/146.5 |
| 6,142,362 | A | 11/2000 | Maus et al. | |
| 6,209,372 | B1 | 4/2001 | Freeman | 219/86.25 |
| 6,225,598 | B1 | 5/2001 | Nihei et al. | 219/137 |
| 6,323,458 | B1 * | 11/2001 | Nomura et al. | 219/61.2 |
| 6,346,684 | B1 | 2/2002 | Gabbianelli et al. | 219/617 |
| 6,405,761 | B1 | 6/2002 | Shimizu et al. | |

FOREIGN PATENT DOCUMENTS

| | | |
|---|---|---|
| EP | 0764493 A1 * | 3/1997 |
| FR | 694774 | 12/1930 |
| JP | 63-230271 A * | 9/1988 |
| JP | 1-95891 A | 4/1989 |
| JP | 3-10089 A | 1/1991 |
| JP | 03-65572 A * | 3/1991 |
| JP | 03-133569 A * | 6/1991 |
| JP | 2000-17338 A | 1/2000 |
| WO | WO97/00595 | 1/1997 |

OTHER PUBLICATIONS

U.S. patent application Publication No. US2001/0000119 A1, Hydroformed Space Frame and Joints Therefor, Jaekel et al., Apr. 5, 2001.

U.S. patent application Publication No. US2001/0019039 A1, Welding Assembly with Nestable Conductive Ends, Gabbianelli et al., Sep. 6, 2001.

4–Page Brochure from Emhart Fastening Teknologies, The Black & Decker Co,.

* cited by examiner

APPARATUS AND METHOD FOR WELDING ALUMINUM TUBES

This application is a continuation-in-part of U.S. patent application Ser. No. 09/518,646, filed Mar. 3, 2001 now U.S. Pat. No. 6,346,684, which was a continuation-in-part of application Ser. No. 09/173,554, filed Oct. 16, 1998, now U.S. Pat. No. 6,092,865, which was based on U.S. Provisional Application Serial No. 60/062,204, filed Oct. 16, 1997, all of which are hereby incorporated herein by reference in their entirety, respectively.

This application is also related to commonly assigned U.S. patent applications being filed concurrently herewith and titled Welding Material With Conductive Sheet and Method (PW Matter No. 280425) and Welding Material and Method Without Carrier (PW Matter No. 280426), the entire contents of each being incorporated herein by reference thereto.

FIELD OF THE INVENTION

The present invention is generally related to welding and an illustrated embodiment of the present invention is related to welding tubular members.

BACKGROUND OF THE INVENTION

Welding operations are used in many industrial applications, such as vehicle construction on vehicle assembly lines. To form certain welded connection, a desired amount of the welding material must be placed between the surfaces of the weldable members where the joint is to be formed and then heated. This type of joint is difficult to form when the weldable members are tubular in form because it becomes difficult to directly access the surfaces to be welded.

Tubular hydroforming technology is increasingly being used in industry, particularly in the automotive industry. Hydroforming technology offers many advantages for automobile frame construction, but the use of common welding methods for welding tubular components is difficult and can result in time and cost inefficiencies. Additionally, the use of steel in automobile frame as resulted in heavy automobiles that are not fuel efficient.

SUMMARY OF THE INVENTION

One object of the invention is to provide a method of welding tubular members, comprising providing first and second tubular members, each of the first and second tubular members being formed at least in part of aluminum, and each of the first and second tubular members having a respective exterior surface; providing at least one welding material member, each of the at least one welding material member being constructed of an electrically conductive metallic welding material capable of bonding in weld-forming relation with the first and second tubular members; securing each of the at least one welding material members on the first tubular member so that each of the at least one welding material members remain in a predetermined position on the first tubular member prior to being in contact with the second tubular member; positioning the second tubular member adjacent the first tubular member with the at least one welding material member being disposed in current transmitting relation between the respective exterior surfaces of the first and second tubular members; and applying an electrical current across the first and second tubular members such that the applied current flows through the respective exterior surfaces of the first and second tubular members and each of the at least one welding material member disposed between the first and second tubular members to weld the respective exterior surfaces of the first and second tubular members together.

Another object of the present invention is to provide a method of welding tubular members, comprising providing first and second tubular members formed at least in part from aluminum, each of the first and second tubular members having a respective exterior surface; providing at least one welding material member carried in a predetermined arrangement by a carrier sheet, each of the at least one welding material members being constructed of an electrically conductive metallic welding material capable of bonding in weld-forming relation with the first and second tubular members; positioning the carrier sheet between the first and second tubular members so that each of the at least one welding material members is disposed in current transmitting relation between the respective exterior surfaces of the first and second tubular members; and applying an electrical current across the first and second tubular members such that the applied current flows through the respective exterior surfaces of the first and second tubular members and each of the at least one welding material members disposed between the first and second tubular members to weld the respective exterior surfaces of the first and second tubular members together.

Another object of the present invention is to provide a welding material assembly comprising a carrier sheet; and a plurality of welding material members mounted on the sheet in a predetermined arrangement, each of the plurality of welding material members being constructed of an electrically conductive metallic welding material capable of melting when heated by application of an electrical current and capable of being welded to a structural weldable member formed at least in part from aluminum, and each of the plurality of welding material members being mounted on the sheet such that when the sheet is placed between the exterior surfaces of the first and second weldable members to be welded each of the plurality of welding material members is electrically conductively disposed between the first and second weldable members.

Other objects, features, and advantages of the present invention will become apparent from the following detailed description, the accompanying drawings, and the appended claims.

DETAILED DESCRIPTION OF THE INVENTION

Figure 1:
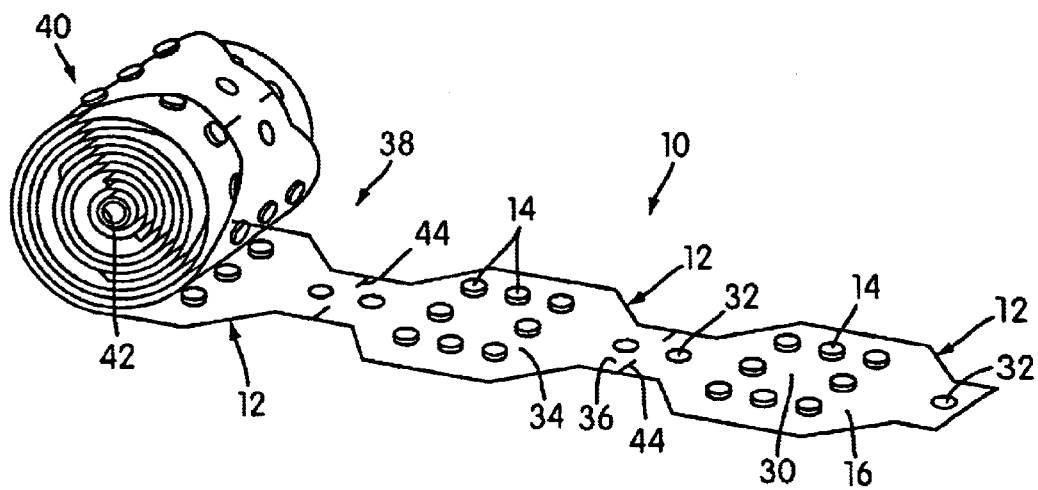
FIG. 1 is a perspective view of a welding material strip assembly constructed according to the principles of the illustrated embodiment of the present invention.

The illustrated embodiments of the invention in FIGS. 1–10 illustrate apparatus and methods for welding two members 18 and 22 with closed cross-sections that are formed at least in part of aluminum. Preferably, the two members 18 and 22 are aluminum tubular members that can be used in structural systems such as a vehicle space frame 60. The two aluminum members 18 and 22 are welded preferably by resistance welding after at least one welding material member 14 is positioned between the aluminum members 18 and 22. In a first embodiment, illustrated in FIGS. 1–4, the welding material members 14 are positioned on aluminum member 18 by a carrier sheet 16, to which the welding material members 14 are attached. In a second embodiment, illustrated in FIGS. 6–10, the welding material members 14 are positioned on aluminum member 18 by welding and without any carrier sheet.

The illustrated embodiments provide greater use of aluminum in such things as structural frames, thus producing a lighter structure. In the case of motor vehicle space frames, the greater use of aluminum results in a lighter space frame 60, which results in such things as increased fuel economy. Also, the illustrated embodiments provide apparatus and methods of welding aluminum members that results in less distortion of the members being welded, which maintains dimensional integrity of the welded joints and the welded members. These embodiments are especially helpful in maintaining dimensional integrity of joints formed by closed section members.

Figure 1A:
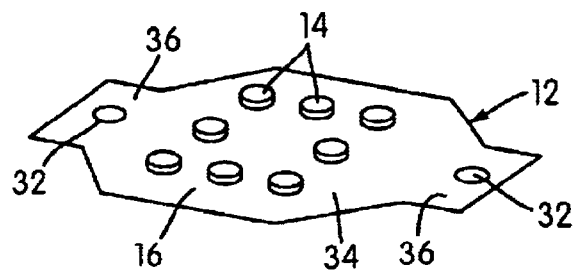
FIG. 1a is a single welding material strip removed from the assembly of FIG. 1.
Figure 2:
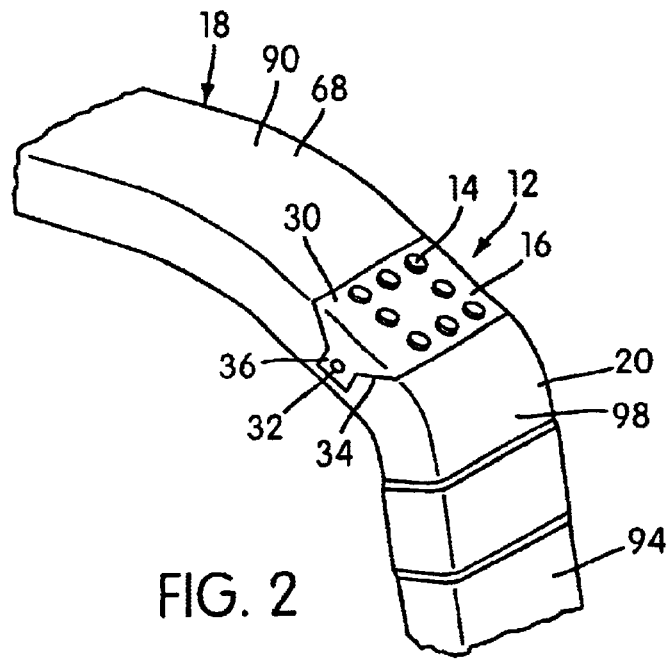
FIG. 2 is a perspective view of a welding material assembly constructed according to the principles of the present invention mounted on a first weldable member.
Figure 2A:
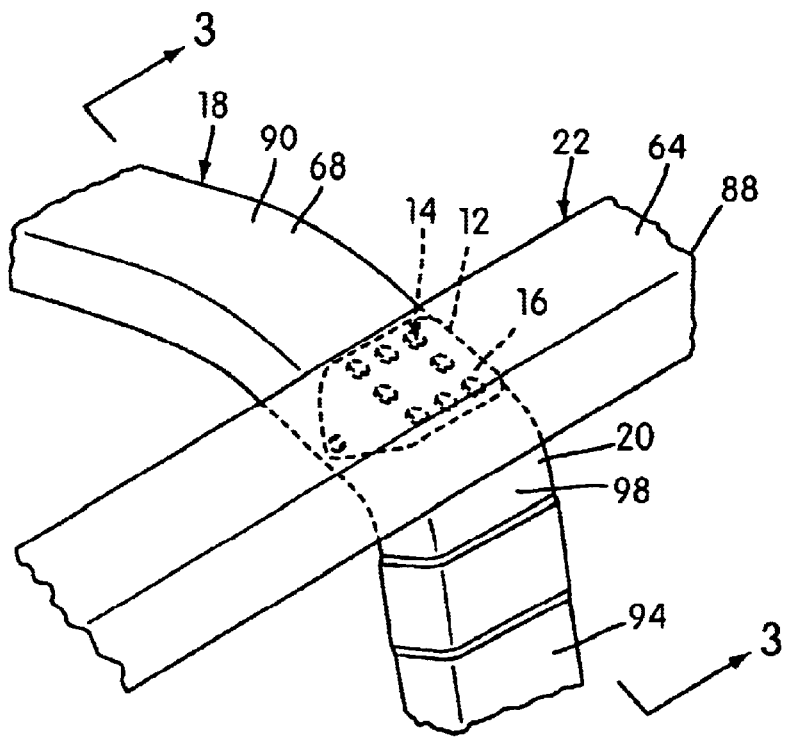
FIG. 2a is a perspective view similar to FIG. 2 but showing a second weldable member positioned on the first weldable member.
Figure 5:
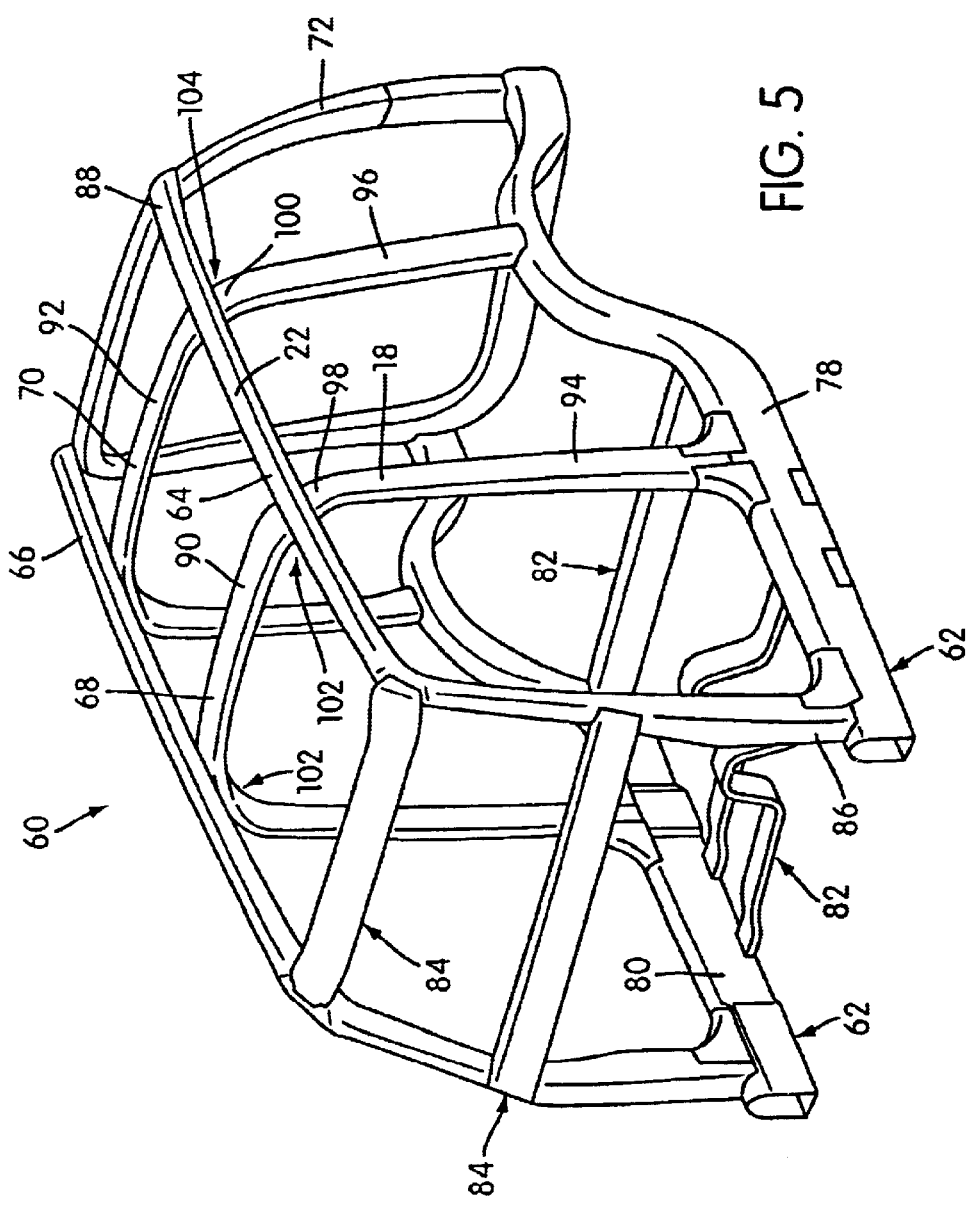
FIG. 5 shows a perspective view of a space frame for a motor vehicle that includes joints formed according to a method of the present invention.

In the first embodiment, FIG. 1 shows a welding material strip assembly, generally designated 10, that is made up of a plurality of welding material assemblies 12 removably joined together to form a rollable continuous strip. Each welding material assembly 12 includes at least one welding material member 14 mounted on a flexible carrier sheet 16 in a predetermined arrangement. As will become apparent, a carrier sheet 16 can be removed from the strip assembly 10, as seen in FIG. 1a, and placed between two surfaces of weldable members 18 and 22, as seen in FIGS. 2 and 2a, where a welded connection is to be formed to thereby position the welding material members 14 carried by the carrier sheet 16 between the surfaces of the weldable members 18 and 22. Assembly 10 can be used to form welds between weldable members 18 and 22 such as those used in a vehicle space frame 60 as seen in FIG. 5.

More particularly, each welding material assembly 12 is constructed and arranged to position welding material 14 in electrically conductive relation between the exterior surface portions 20 and 24 of first and second weldable members 18 and 22 at a location where the first and second weldable members 18 and 22 are to be joined. Each welding material member 14 is preferably constructed of an electrically conductive metallic welding material capable of melting when heated by application of an electrical current. Each flexible carrier sheet 16 is preferably constructed of a flexible material that can appropriately hold the welding material members 14. The carrier sheet 16 can be electrically nonconductive or electrically conductive, and each welding material member 14 is mounted on or in the carrier sheet 16 such that when the carrier sheet 16 is placed between exterior surfaces 20 and 24 of first and second weldable members 18 and 22 to be welded, each welding material member 14 is electrically conductively disposed therebetween. In the illustrated embodiment, the carrier sheet 16 is formed of electrically conductive material, such as metal. In particular, the carrier sheet 16 can be formed of thin sheets of metal such as copper or aluminum, or other materials that are appropriately compatible with the aluminum members 18 and 22 and the welding material members 14 that are compatible for welding aluminum members 18 and 22.

The welded connection is formed by positioning at least one welding material member 14 constructed of a metallic welding material that is preferably different from the metallic material used to construct each of the weldable members 18, 22 between the exterior surfaces 20, 24 to be joined. As best seen in FIGS. 1 and 1a, preferably a plurality of welding material members 14 are mounted on each carrier sheet 16 (although only one is required) for positioning between the surfaces 20, 24 to be joined (i.e., welded together) and preferably these welding material members 14 are arranged in a predetermined manner on each carrier sheet 16 to position the welding material members 14 to maximize joint strength and optimize joint formation. In the exemplary embodiment of the welding material assembly 12 shown in FIGS. 1–3, each welding material member 14 is a thin, small diameter disk-shaped member, but it can be understood that a wide range of welding material member shapes and sizes are contemplated.

Figure 4:
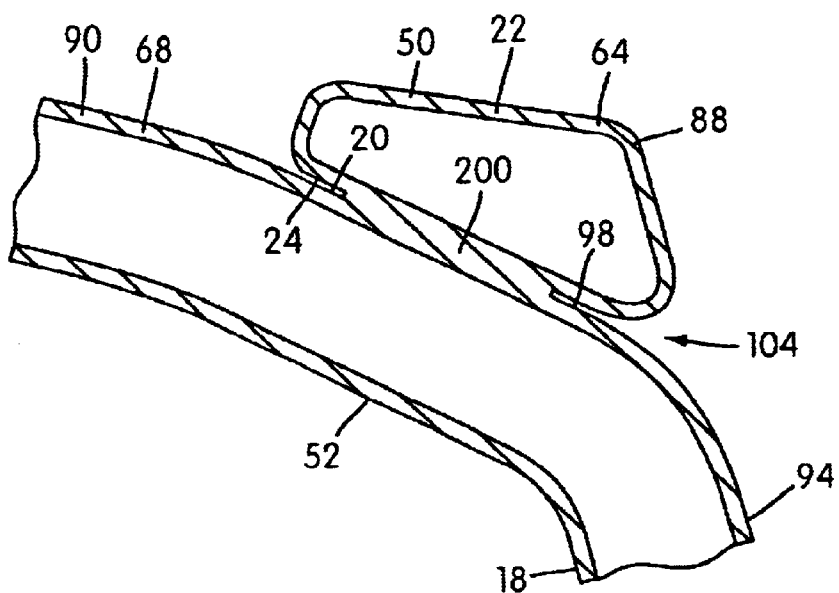
FIG. 4 is a view similar to FIG. 3 except showing the first and second weldable members after joint formation.

The size and shape selected for each of the welding material members 14 will depend on many factors including the materials used to construct the weldable members 18 and 22, the material used to construct the welding material members 18 and 22 and the size and shape of the joint area between the two weldable members 18 and 22 (i.e., the size and shape of the overlapping surface areas of the two weldable members). Each welding material member 14 is shown being a circular disc, but can have any desired shape. As mentioned, it is contemplated to provide welding material assemblies 12 in which a single welding material member 14 is mounted on each carrier sheet 16. A range of broad, thin shapes (e.g., a large X-shape) of the welding material member 14 is contemplated for instances in which only one welding material member 14 is mounted on each sheet 16. Preferably a plurality of welding material members 14, each being in the form of a small thin disk is mounted on each carrier sheet 16. The thin, small diameter disk shape readily permits discreet localized areas of electric current flow between the weldable members 18, 22, which facilitates melting of the members 14. Also, if the carrier sheet 16 is conductive, it aids in melting the carrier sheet 16. As seen in FIG. 4, when the carrier sheet 16 is conductive and melts along with the welding material members 14, a uniform weld 200 can be formed.

A preferred welding material for the welding material members 14 is a material that can weld aluminum members 18 and 22. For example, welding material members 14 can be made of aluminum such as 4043, 5356, 2219/2519 or similar aluminum alloys, aluminum scandium, and other alloys such as nickel-based alloys like Incalloy. It is contemplated to use a wide range of metallic welding materials being formed at least partly of aluminum to form aluminum members 18 and 22. For example aluminum members may be formed of 5000 or 6000 series aluminum. Appropriate aluminum alloys may also be employed to form aluminum members 18 and 22.

The welding material used to construct each welding material member 14, and carrier sheet 16 if it is formed of conductive material, should be more resistive (i.e., have a greater resistance to the flow of electrical current) and have a lower melting point than the metallic material used to construct each weldable member 18, 22.

The carrier sheets 16 allow the welding material members 14 to be easily handled and to be held in a predetermined configuration between the surfaces 20, 24 to be welded together before the weld 200 is formed. Preferably a central portion 30 of each carrier sheet 16 has a size and shape that corresponds to the area of the overlap between the overlying exterior adjacent surfaces 20, 24 to be bonded and preferably the welding material members 14 are of a predetermined size and shape and are arranged in a predetermined pattern to assure optimal bonding between the weldable members 18, 22.

If formed as a nonconductive carrier, each carrier sheet can be constructed of an electrically nonconductive paper or plastic material that disintegrates during the welding process to an extent sufficient to permit the welding material members 14 to expand in diameter when melted during welding. In the preferred embodiment illustrated herein, carrier sheet 16 is formed of a conductive material. As mentioned above, the carrier sheet 16 can be a metal material, such as aluminum or copper or the like. When the carrier sheet 16 is a conductive material, the carrier sheet 16 can melt with the welding material members 14, which will allow both the welding material members 14 and the carrier sheet 16 to expand during welding and create a substantially continuous layer of welding material and carrier sheet material between the weldable members 18 and 22 creating a substantially continuous and strong weld 200.

The carrier sheet 16 should be thinner than the welding material members 14 so that the carrier sheet 16 does not interfere with the forces applied during welding as will be described. The welding material members 14 can be mounted to the carrier sheet 16 in any appropriate manner and/or by any appropriate mechanism. One preferred manner of attaching welding material members 14 is by forcing the welding material members 14 into pre-formed holes in the carrier sheet 16, so that the welding material members 14 become wedged in the preformed holes. That is, the welding material members 14 can be connected to the carrier sheet by a "snap-fit." Also, welding material members 14 can be attached by an adhesive. If the carrier sheet 16 is formed from conductive materials, additional examples of connections between the carrier sheet 16 and the welding material members 14 are a conductive adhesive, soldering, brazing, spot welding, or projection welding.

Preferably the carrier sheet 16 further includes a plurality of securing weldable material members 32 constructed and arranged to affix the carrier sheet 16 to a surface of one of the weldable members such as surface 20 of a metallic member 18 at a location thereon where a welded connection is to be formed. The securing weldable material members 32 hold the carrier sheet 16 in place while the second weldable member is place in overlying relation thereto. The carrier sheet 16 can be mounted to the surface 20 of metallic member 18 by conductive adhesive, soldering, brazing, spot welding, or projection welding at the securing weldable material members 32. In the exemplary embodiment of the welding material assembly 12 shown, for example, in FIGS. 1–2, the carrier sheet 16 has a pair of tapered portions 34 on each side of the central portion 30 that terminate in narrow end portions 36. A securing weldable material member 32 is provided on each end portion 36 to enable the assembly 12 to be welded to the sides of one of the members 18 and 22 prior to resistance welding. Alternatively, the members 32 can be adhesive members such as a two-faced tape or any other appropriate structure that can hold the carrier sheet 16 to one member 18 or 22 while the other member 18 or 22 is placed in overlying relation.

Although carrier sheets 16 can be used as individual stand-alone sheets, as mentioned above and as shown in FIG. 1, the individual weld carrier sheets 16 can be removably attached end-to-end to form the welding material strip assembly 10. Because the carrier sheets 16 are thin and preferably flexible, the welding material strip assembly 10 can be easily wound into a roll 40. The exemplary strip assembly 10 is shown in FIG. 1 wound around a spindle 42 for easy storage, shipping and handling. The carrier sheets 16 are preferably manufactured as a continuous strip of material that is perforated at boundaries between adjacent end portions 36 by a series of small aligned slits 44, although a wide range of manufacturing methods and structures for removably securing the sheets 16 together is contemplated.

Figure 3:
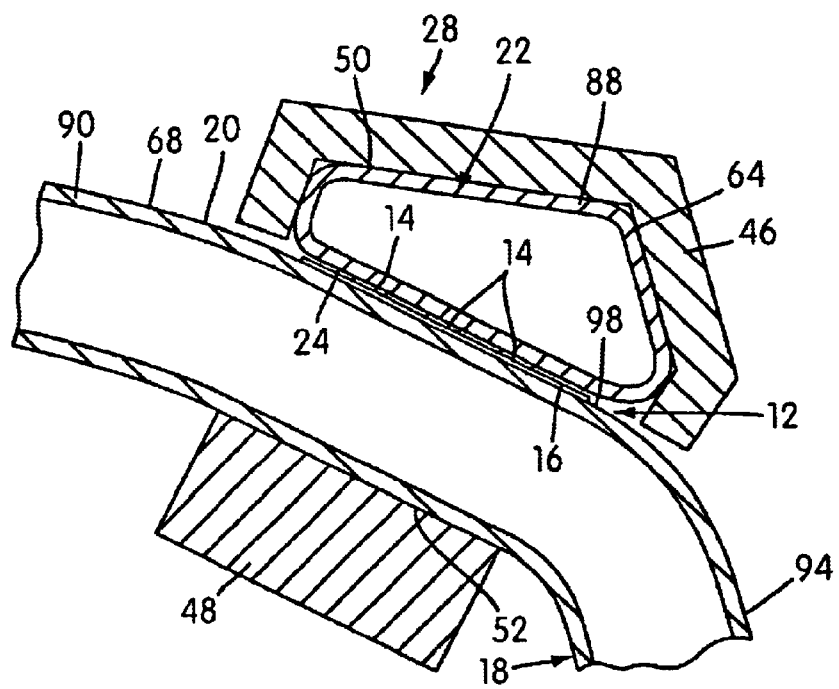
FIG. 3 is a sectional view taken along line 3—3 of FIG. 2a and showing the welding material assembly disposed between the first weldable member and a second weldable member prior to joint formation and showing a schematically represented resistance welding apparatus engaged with the weldable members.

The details of the construction and use of the welding material assemblies 12 can be understood from FIGS. 2–4. FIG. 2 shows an individual welding material assembly 12 mounted on an exterior surface portion 20 of first weldable member in the form of a first tubular hydroformed member 18. FIG. 2a shows second weldable member 22 in the form of a second tubular hydroformed member 22 disposed in overlying relation to the first weldable member 18 with the welding material assembly 12 disposed therebetween. The first and second members 18, 22 in FIGS. 2–4 are intended to be a generic representation of two members that can be welded together using a welding material assembly 12 in a manner described below. Although members 18 and 22 can be hydroformed tubes, the tubular members 18 and 22 illustrated herein can be formed by any appropriate method. Additionally, although the members 18 and 22 are illustrated as being tubular, with closed cross-sections, other shapes and configurations of members 18 and 22 are permissible including tubular configurations with open cross-sections and non-tubular configurations. As will become apparent, the exemplary first and second members 18, 22 used to illustrate the welding process are portions of individual hydroformed members that are joined together to form part of a space frame as shown in FIG. 5. A modified resistance weld apparatus generally designated 28 is shown schematically in FIG. 3 engaged with the weldable members 18, 22. FIG. 4 shows the first and second weldable members 18, 22 after joint formation.

The welding process illustrated in FIG. 3 is a derivative of resistance welding and utilizes transient liquid phase bonding and resistance heating. The welding material assembly 14 can be used, for example, to join together two tubular members 18, 22. The welding material assembly 14 and a preferred method of using the same provide a way for individual hollow sections of the pair of members 18, 22 to be welded together in adjoining relation without direct access to the welding surfaces 20, 24, respectively, of the weldable members 18, 22 while the welded connection (or joint) is being formed.

To form a joint in accordance with the method of the invention, one carrier sheet 16 is removed from the welding material strip assembly 10 to separate one welding material assembly 12 from the continuous strip, which can be formed as roll 40. The single welding material assembly 12 is placed on the exterior surface portion 20 of the first hydroformed member 18 (FIG. 2) in the location where the joint is to be formed and is held there by the securing weldable material members 32. The second hydroformed member 22 is placed in overlying relation to the sheet 16 (FIGS. 2a and 3) so that the exterior surface 24 is in contact with the welding material members 14.

An appropriate welding apparatus, such as a modified resistance weld gun apparatus 28 (or a modified spot welding gun) is used to apply an electrical current and an axial force (i.e., a force perpendicular to the two exterior surfaces 20, 24 in the weldable members 18, 22) across the two members 18, 22 and across the welding material members 14 and carrier sheet 16 during joint formation. More particularly, the apparatus 28 includes a pair of current conducting members 46, 48 (that supply an electrical current from a current source to form the weld) that are applied to exterior surfaces 50, 52, respectively, of the two hydroformed members 18, 22 to be joined in the area where the weld connection or joint therebetween is to be formed. The weld gun apparatus 28 can be controlled manually or robotically. An appropriate apparatus and method for welding members 18 and 22 is disclosed in commonly assigned U.S. patent application Ser. No. 09/754114 for a Welding Assembly with Nestable Conductive Ends, filed on Jan. 5, 2001, the entire contents of which are hereby incorporated herein by reference thereto.

The conductive members 46, 48 cause a current to flow through the surfaces 20, 24 to be bonded (i.e., joined) and through the welding material members 14. When the material of the carrier sheet 16 is electrically conductive, the carrier sheet 16, melts with the corresponding welding material members 14 and is incorporated into each weld connection (that is, while a current is being supplied by the apparatus 28). The welding material members 14 and carrier sheet 16 are more resistive and have a lower melting point than the base joint metallic material used to construct the members 18, 22. The material properties of the contiguous members 14, 16, 18, 22 combine to create preferential heating and subsequent localized melting of the welding material members 14 and carrier sheet 16 prior to the melting of the hollow section material of the members 18, 22. The welding material members 14 and carrier sheet 16 liquefy during the welding process.

The energy required to liquefy the welding material members 14 and carrier sheet 16 is generated by the applied electrical current. The welding material members 14 and carrier sheet 16 heat up preferentially and cause melting of the welding material members 14 and carrier sheet 16 and then localized melting of the adjacent metallic material of the hydroformed members 18, 22. The melted material of the welding material members 14 and carrier sheet 16 bonds with the basic metallic material of the members 18, 22 under the axial pressure applied by the conductive members 46, 48. After the aforementioned melting occurs, the current that flows through the surfaces 20, 24 is switched off. The axial force is preferably removed a predetermined amount of time thereafter.

The resulting welded connection 200 is represented in FIG. 4. The carrier sheet 16 has melted along with the welding material members 14 in FIG. 4. The combining of the metallic materials of the metal members 14, 16, 18, 22 is indicated in the cross sectional view of FIG. 4. It can be appreciated that this representation of the welded area 200 is enlarged and exaggerated to more clearly illustrate the welded connection and to indicate the mixing of the metallic materials in the areas where the weld is formed.

Preferably the current is applied through the first and second weldable members 18, 22 and across the welding material members 14 and carrier sheet 16 so as to melt the welding material members 14 and carrier sheet 16 and thereafter to melt portions of the first and second weldable members 18, 22 in areas thereof that are adjacent to the welding material members 14 and carrier sheet 16 and preferably the forces are applied so as to move the first and second exterior surface portions 20, 24 toward one another.

Preferably, each of the exterior surfaces 20, 24 is planar, although they may be of any configuration that is adapted for joint formation. For example, the surfaces can have complimentary convex/concave configurations and the like.

It can be understood that the welding material assemblies 12 and methods for using the same are particularly well suited for forming joints between individual members 18 and 22. While the welding material strip assembly 12 provides particular advantages in welding tubular hydroformed weldable members 18 and 22, it is contemplated that it may also have application in welding other weldable members that have not been hydroformed, but which nevertheless inhibit access to the surfaces to be welded.

As seen in FIG. 5, it is contemplated to use the welding material assemblies 12 and methods of present invention to form joints between the individual members used to construct a space frame 60 for a motor vehicle. An example of a method for using a welding material assembly 12 for forming a space frame 60 and its joints is generally described below. The example is described with reference to an exemplary embodiment of a space frame 60 for a sports utility vehicle shown in FIG. 5. Other examples of space frame joints that are particularly well suited for use with the present welding material assemblies and with methods utilizing the assemblies are disclosed in commonly assigned U.S. Pat. No. 6,092,865 and entitled HYDROFORMED SPACE FRAME AND METHOD OF MANUFACTURING THE SAME, which is hereby incorporated by reference thereto in its entirety into the subject application.

FIG. 5 shows a perspective view of a motor vehicle space frame 60. The space frame 60 includes a pair of longitudinally extending, laterally spaced side rail structures 62, a pair of hydroformed upper longitudinal members 64, 66, a pair of hydroformed U-shaped cross members 68, 70 and a rearward ring assembly 72. Preferably the side rail structures 62 are provided by a pair of hydroformed members 78, 80 of mirror image construction. A plurality of laterally extending cross structures generally designated 82 are connected between the side rail structures 62 and a pair of laterally extending upper cross structures 84 are connected between the pair of upper longitudinal members 64, 66.

Each hydroformed upper longitudinal member 64, 66 includes a pillar forming portion 86 and a longitudinally extending portion 88. Each upper longitudinal member 64, 66 is connected to an associated side rail structure 62 and extends upwardly therefrom to form an A pillar of the space frame 60. Each hydroformed cross member 68, 70 includes a cross portion 90, 92, respectively, and a pair of leg portions 94, 96, respectively, extending from junctures 98, 100 at opposite ends of the associated cross portion. Each leg portion of the cross member is connected to a respective side rail structure 62 and extends upwardly therefrom to provide an intermediate pillar thereon (i.e., the B pillars and C pillars). The longitudinally extending portion 88 of each upper longitudinal member 64, 66 is connected to the juncture 98, 100 of the associated cross member 68, 70 to form a joint 102, 104, respectively. While the members 18 and 22 join to form a single joint 102 in space frame 60 as illustrated in FIG. 5, it should be understood that the methods and apparatus to join members 18 and 22 can be used for any of the numerous joints of space frame 60 and as illustrated in FIG. 5.

The second illustrated embodiment is shown in FIGS. 6–10. In the second embodiment the material welding members 14 are applied to aluminum member 18 without the use of carrier sheet 16. This application of material welding members 14 is accomplished though attachment of the material welding members 14. The illustrated manner of attachment is welding, although any appropriate manner of attachment is possible, such as adhesive. The elements of second embodiment illustrated in FIGS. 6–10 except for the manner of attaching the welding material members 14 to aluminum member 18 prior to placing aluminum member 22 on top of the welding material members are substantially identical to the elements of the first embodiment of FIGS. 1–5, as described above. Accordingly, only the manner of attaching the welding material members 14 to aluminum member 18 without a carrier sheet, prior to placing aluminum member 22 on top of the welding material members, will be described in detail with respect to the second embodiment. In the description of the embodiment of FIGS. 6–10, identical reference numbers are used for elements in the first embodiment of FIGS. 1–5 that are substantially identical to the same elements in the second embodiment of FIGS. 6–10.

Figure 6:
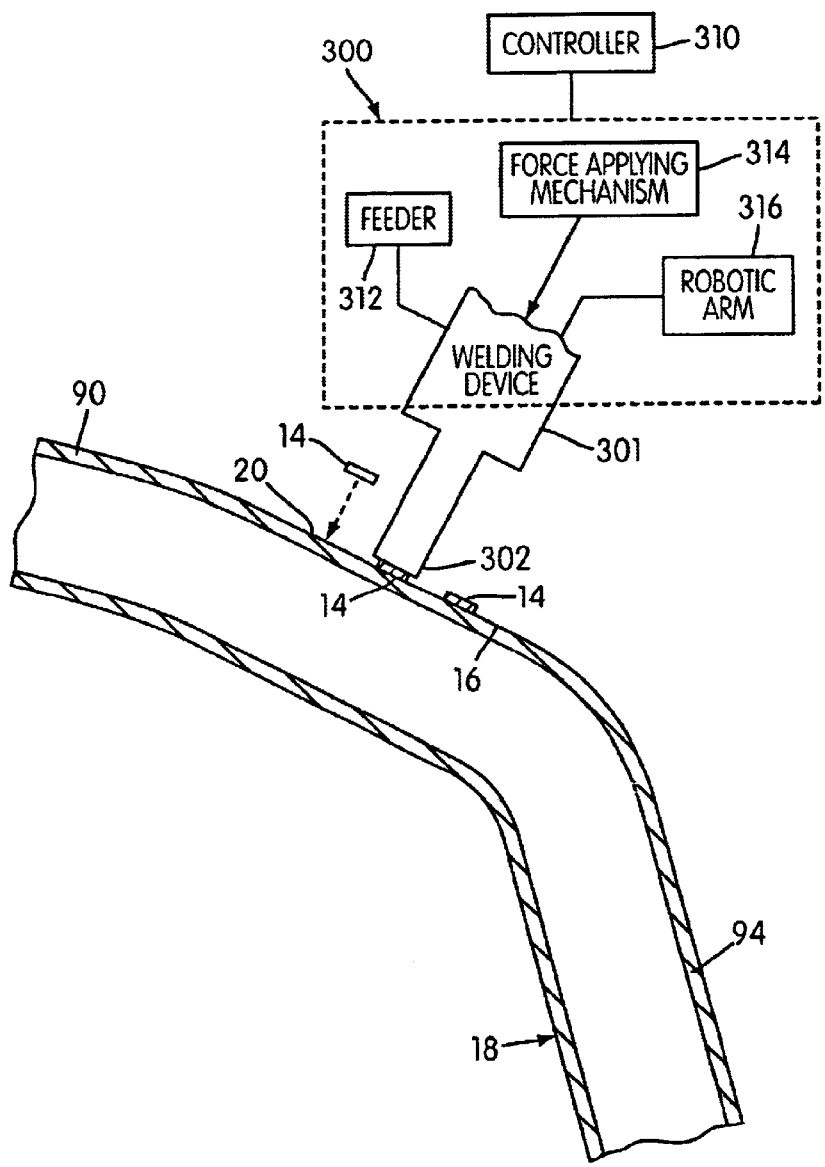
FIG. 6 is a cross-sectional view of a welding device and method according to the principles of another illustrated embodiment of the present invention.
Figure 8:
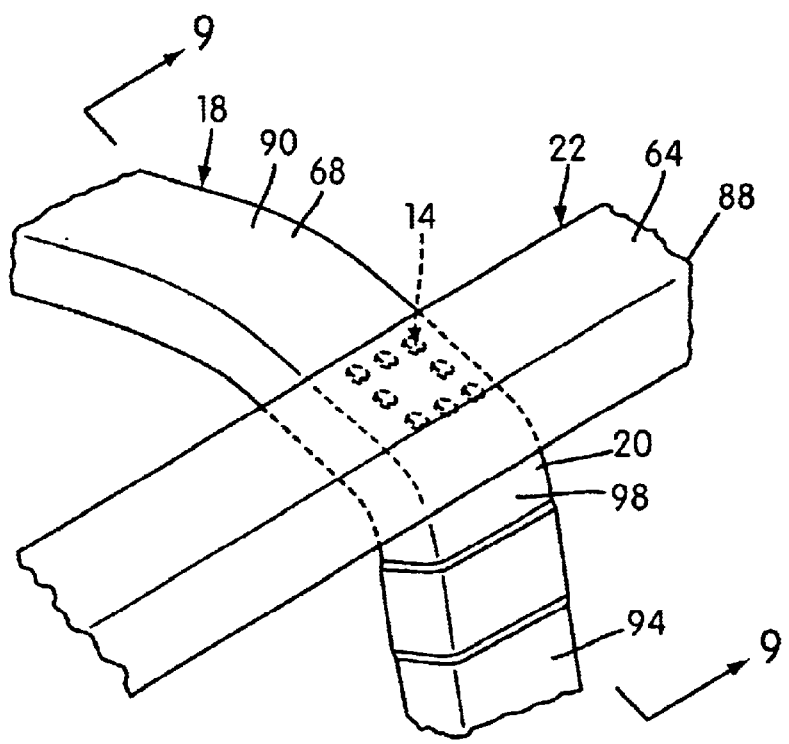
FIG. 8 is a perspective view similar to FIG. 7 but showing a second weldable member positioned on the first weldable member.
Figure 10:
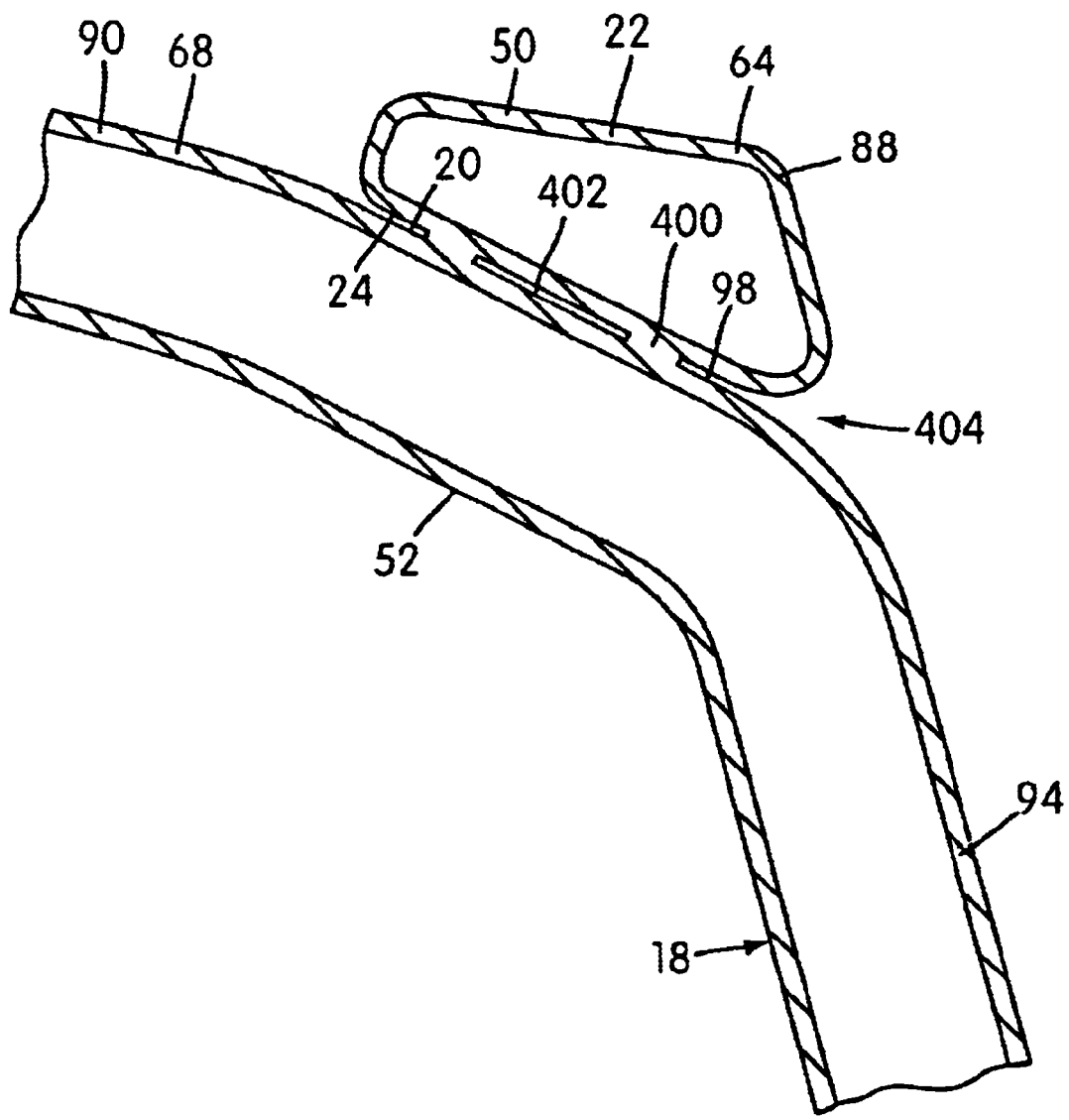
FIG. 10 is a view similar to FIG. 9 except showing the first and second weldable members after joint formation.

FIG. 6 shows welding material members 14 and weldable member 18. Additionally, a projection welding device is generally indicated at 301. As above, a plurality of welding material members 14 may be bonded to an exterior surface 20 of the weldable member 18 where a welded connection is to be formed by a welding process and an additional weldable member 22, as seen in FIG. 8, may be positioned in contacting, overlying position relative to the welding material members 14 and weldable member 18, such that the welding material members 14 may be disposed between surfaces of the weldable members 18 and 22. Then, after a welding process, weldable members 18 and 22 are joined at the connection between the two members 18 and 22 through the use of the welding material members 14 as seen in FIG. 10.

The size and shape selected for each of the welding material members 14 will depend on many factors including the materials used to construct the weldable members 18 and 22, the material used to construct the welding material members 14 and the size and shape of the joint area between the two weldable members (i.e., the size and shape of the overlapping surface areas of the two weldable members 18 and 22). Additionally, if the welding material members 14 are intended to be attached to weldable member 18 by welding, the characteristics of the welding material members 14 may be dependent in part on the abilities and limitations of the projection welding device 301 for attaching the weldable member 18. Some characteristics of the weldable material members 14 may also be dependent on the welding device 28, which ultimately welds weldable members 18 and 22. Each welding material member 14 is shown being a circular disc, but can have any appropriate, desired shape.

Figure 7:
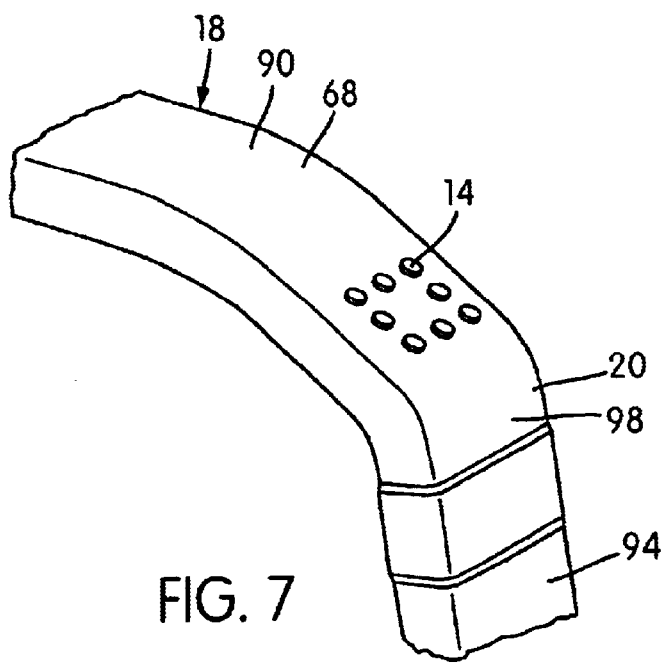
FIG. 7 is a perspective view of a welding material assembly constructed according to the principles of the second embodiment of the invention mounted on a first weldable member.

At least one and preferably a plurality of welding material members 14 are bonded to the weldable member 18 for later being positioned between the surfaces 20, 24 to be joined (i.e., welded together). Preferably, these welding material members 14 are positioned to maximize joint strength and optimize joint formation. In the illustrated embodiment, each welding material member 14 is a small diameter disk-shaped member as seen in FIGS. 6–8, but it can be understood that a wide range of welding material member 14 shapes and sizes are contemplated.

The welding material members 14 are mounted on weldable support member 18 at a predetermined position so that each welding material member 14 will stay in place on the weldable member 18 until the second weldable member 22 is positioned over the weldable member 18 and on top of welding material members 14. This attachment of welding material members 14 can occur by any appropriate attaching method, such as using adhesives, mechanical fasteners, or welding. In the illustrated embodiment, the attachment of the welding members 14 is accomplished by welding, such as liquid transient welding, and by using welding device 301. As illustrated in FIG. 6, the illustrated process is directed to each of a plurality of welding material members 14 being individually fastened to the surface 20 to be welded by a welding material member welding assembly 300 that includes a resistance welding device 301, a welding member feeder 312, a force applying mechanism 314, and a robotic arm 316. The welding assembly 300 can be similar to stud welding devices such as The Warren Stud Welding System (SKK 140 or SKK 210 Series) manufactured by Emhart Fastening Technologies and which includes a TMP Series Welder Controller, a 36000 Series Stud Feeder and a weld head or weld gun. The welding assembly 300 can also be similar to the WELDFAST System for welding brackets and clips also manufactured by Emhart Fastening Technologies.

It is contemplated that the resistance welding process illustrated in FIG. 6, may be automatically or manually performed. When automatically preformed, a controller 310, as generally known in the art, controls the welding assembly 300 and welding device 301.

As shown schematically in FIG. 6, the resistance welding device 301 includes a welding member support structure 302 at one end thereof. Often, the welding member support structure 302 is in the form of a collet or chuck, which is capable of receiving and gripping a periphery of the welding material member 14 in a similar manner as is generally known in the art with respect to stud welding. The welding member support structure 302 is constructed and arranged to grip the periphery of each welding material member 14 relatively securely and to be movable relative to the weldable member 18 to thereby move the welding material member 14 into contact with the surface 20 to be welded. Each welding member 14 would be positioned on the support structure 302 by a nugget feeder 312 that could hold a large number of welding material members 14 and then feed a single nugget or single welding material member 14 to the support structure 302 in a manner generally similar to the feeder of individual studs in a stud welding device. An appropriate force applying mechanism 314 could move and apply sufficient force to the welding material member 14 against the weldable member 18 during welding.

It is contemplated that, for an automated process, the projection welding device 301 may be mounted to robotic arm 316 or other automated movement system, or for a manual process, that the projection welding device 301 may be a handheld device.

In any case, as shown in FIG. 6, the projection welding device 301 is brought into position adjacent a desired location for a welding material member 14 to be placed on the surface 20 to be welded. The welding device 301 then moves along with the welding material member 14 in its support 302, toward the surface 20 to be welded. At a point when the welding material member 14 is substantially in contact with the surface 20 to be welded, a current is applied across the welding material member 14 between the projection welding device 301 (more specifically, the welding member support structure 302) and the weldable member 18. The current causes the welding material member 14 to bond (by liquid transient welding) to the weldable member 18 at a point of greatest resistance, i.e., the intersection between the surface to be welded 20 and the welding material member 14, as shown in FIG. 6. To illustrate the steps, FIG. 6 illustrates a welding material member 14 to the right that is welded to surface 20, a middle welding material member 14 between the surface 20 and the support structure 302 that is being welded, and a left welding material member 14 that has yet to be welded and would be supplied, for instance by feeder 312.

The welding material members 14 may be fastened to the weldable member 18 in any arrangement desirable. FIG. 7 shows one such arrangement. Other arrangements are, of course, possible as long as sufficient weldable material is present to form a sufficiently strong welded bond (e.g., the welding material members 14 are in sufficient number and size).

To form a joint in accordance with the method of the invention, the welding material members 14 are bonded to the hydroformed member 18 in a desired arrangement. The second weldable member 22 is then placed in contacting, overlying relation to the welding material members 14 so that the welding material members 14 are disposed between and in conductively contacting relation to the weldable members to be joined 18, 22, as shown in FIGS. 8 and 9.

The welding method of the second embodiment can be understood from FIGS. 6–10. FIG. 6 shows the welding material members being attached aluminum member 18. FIG. 7 shows welding material members 14 mounted on an exterior surface portion 20 of first weldable member 18, which is illustrated in the form of a tubular member. FIG. 8 shows a first weldable member 22 in the form of a second tubular member disposed in overlying relation to the first weldable member 18 with the welding material members 14 disposed therebetween. The weldable members 18 and 22 are intended to be a generic representation of two members that can be welded together using welding material members 14 in a manner described below. As will become apparent, the exemplary members 18 and 20 are used to illustrate the welding process and are portions of individual hydroformed members that are joined together to form part of a space frame 60 as shown in FIG. 5. A modified resistance weld apparatus, or welding device, generally designated 28, is shown schematically in FIG. 9 engaged with the weldable members 18, 22. FIG. 10 shows the weldable members 18 and 22 after joint formation.

Figure 9:
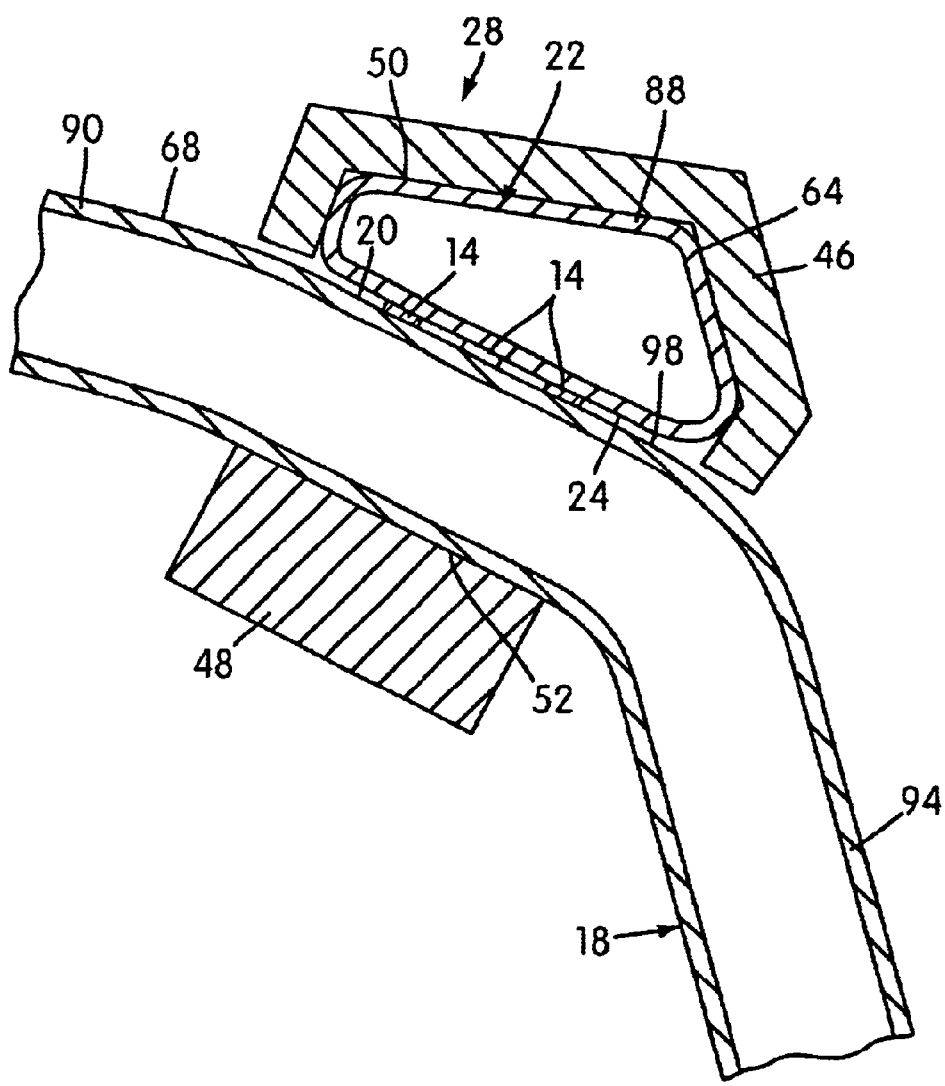
FIG. 9 is a sectional view taken along line 9—9 of FIG. 8 and showing the welding material assembly disposed between the first weldable member and a second weldable member prior to joint formation and showing a schematically represented resistance welding apparatus engaged with the weldable members.

The welding process illustrated in FIG. 9 is substantially identical as that described above with respect to FIG. 3 except that FIG. 9 illustrates the welding material members 14 being welded without a carrier sheet 16. Accordingly, this welding process will not be described again in detail.

The resulting welded connection 404 using the second embodiment is represented in FIG. 10. As shown, depending on the number, size, and configuration of the welding material members 14, a very thin gap 402 may be left between the weldable members 18, 22 as seen in FIG. 10, or no gap may exist and the connection 400 may be a continuous, homogenous connection between the weldable members 18 and 20. The combining of the metallic materials of the metal members 14, 18, 22 is indicated in the cross sectional view of FIG. 10. It can be appreciated that this representation of the welded area is enlarged and exaggerated to more clearly illustrate the welded connection and to indicate the mixing of the metallic materials in the areas where the weld is formed.

Additionally, the above-described apparatus and method of the second embodiment as illustrated in FIGS. 6–10 permits the attachment of welding material members 14 without the use of any backing that would hold the welding material members 14 in a predetermined configuration prior to their attachment to weldable member 18. Thus, saving in backing sheets can be achieved in the attachment of the welding material members 14 without any backing sheets.

While the invention has been disclosed and described with reference with a number of embodiments, it will be apparent that variations and modifications may be made thereto without departure from the spirit and scope of the invention. Therefore, the following claims are intended to cover all such modifications, variations, and equivalents thereof in accordance with the principles and advantages noted herein.

What is claimed is:

1. A method of welding tubular members, comprising:
   providing first and second tubular members, each of the first and second tubular members being formed at least in part of aluminum, and each of the first and second tubular members having a respective exterior surface;
   providing at least one welding material member, each of the at least one welding material member being constructed of an electrically conductive metallic welding material capable of bonding in weld-forming relation with the first and second tubular members;
   securing each of the at least one welding material member on the first tubular member so that each of the at least one welding material member remains in a predetermined position on the first tubular member prior to being in contact with the second tubular member;
   positioning the second tubular member adjacent the first tubular member with the at least one welding material member being disposed in current transmitting relation between the respective exterior surfaces of the first and second tubular members; and
   applying an electrical current across the first and second tubular members such that the applied current flows through the respective exterior surfaces of the first and second tubular members and each of the at least one welding material member disposed between the first and second tubular members to weld the respective exterior surfaces of the first and second tubular members together.

2. A method according to claim 1, wherein the providing first and second tubular members includes providing first and second aluminum tubular members.

3. A method according to claim 1, wherein the providing of the first and second tubular members includes hydroforming each of the first and second tubular members by a process of providing a tubular metallic blank having a tubular metallic wall, placing the tubular metallic blank into a die cavity of a die assembly, the die cavity having die surfaces, and providing a high pressure fluid into an interior of the blank to expand the metallic wall of the blank outwardly into conformity with the surfaces of said die cavity.

4. A method according to claim 1, wherein the providing at least one welding material member includes providing a plurality of welding material members.

5. A method according to claim 1, wherein the providing at least one welding material member includes providing at least one welding material member formed at least in part of aluminum.

6. A method according to claim 1, wherein the providing at least one welding material member includes providing at least one welding material member formed at least in part of nickel.

7. A method according to claim 1 wherein the securing of each of the at least one welding material member is accomplished by welding.

8. A method of welding tubular members, comprising:

providing first and second tubular members formed at least in part from aluminum, each of the first and second tubular members having a respective exterior surface;

providing at least one welding material member carried in a predetermined arrangement by a carrier sheet, each of the at least one welding material member being constructed of an electrically conductive metallic welding material capable of bonding in weld-forming relation with the first and second tubular members;

positioning the carrier sheet between the first and second tubular members so that each of the at least one welding material member is disposed in current transmitting relation between the respective exterior surfaces of the first and second tubular members; and applying an electrical current across the first and second tubular members such that the applied current flows through the respective exterior surfaces of the first and second tubular members and each of the at least one welding material member disposed between the first and second tubular members to weld the respective exterior surfaces of the first and second tubular members together.

9. A method according to claim 8, wherein the providing first and second tubular members includes providing first and second aluminum tubular members.

10. A method according to claim 8, wherein the providing of the first and second tubular members includes hydroforming each of the first and second tubular members by a process of providing a tubular metallic blank having a tubular metallic wall, placing the tubular metallic blank into a die cavity of a die assembly, the die cavity having die surfaces, and providing a high pressure fluid into an interior of the blank to expand the metallic wall of the blank outwardly into conformity with the surfaces of said die cavity.

11. A method according to claim 8, wherein the providing at least one welding material member includes providing a plurality of welding material members.

12. A method according to claim 8, wherein the providing at least one welding material member includes providing at least one welding material member formed at least in part from aluminum.

13. A method according to claim 8, wherein the providing at least one welding material member includes providing at least one welding material member formed at least in part from nickel.

* * * * *

UNITED STATES PATENT AND TRADEMARK OFFICE
CERTIFICATE OF CORRECTION

PATENT NO. : 6,689,982 B2
DATED : February 10, 2004
INVENTOR(S) : Gianfranco Gabbianelli et al.

It is certified that error appears in the above-identified patent and that said Letters Patent is hereby corrected as shown below:

<u>Title page,</u>
Item [63], Related U.S. Application Data, replace "Continuation-in-part of application No. 09/518,646, filed on Mar. 3, 2000, now Pat. No. 6,346,684, which is a continuation-in-part of application No. 09/173,554, filed on Oct. 16, 1998, now Pat. No. 6,042,865." with -- Continuation-in-part of application No. 09/518,646, filed on Mar. 3, 2000, now Pat. No. 6,346,684, which is a continuation-in-part of application No. 09/173,554, filed on Oct. 16, 1998, now Pat. No. 6,092,865. --

Signed and Sealed this

Twenty-ninth Day of June, 2004

JON W. DUDAS
*Acting Director of the United States Patent and Trademark Office*